US006237003B1

(12) United States Patent
Lewish et al.

(10) Patent No.: US 6,237,003 B1
(45) Date of Patent: May 22, 2001

(54) METHOD AND APPARATUS FOR SUPPORTING DYNAMIC RUN-TIME OBJECT DEFINITION IN A RELATIONAL DATABASE MANAGEMENT SYSTEM

(75) Inventors: Keith Lewish, Philadelphia; Duane Boone, Holland, both of PA (US); Ed Carrigan, Marlton, NJ (US)

(73) Assignee: Platinum Technology IP, Inc., Oakwood Terrace, IL (US)

( * ) Notice: Subject to any disclaimer, the term of this patent is extended or adjusted under 35 U.S.C. 154(b) by 0 days.

(21) Appl. No.: 09/201,607

(22) Filed: Nov. 30, 1998

(51) Int. Cl.$^7$ .................................................... G06F 17/30
(52) U.S. Cl. .......................... 707/101; 707/4; 707/100; 707/102; 707/103; 700/103; 700/106; 709/213; 709/217
(58) Field of Search .................. 707/1–4, 100, 707/103, 8, 10, 101, 102, 104, 202–204; 700/100, 103, 109, 106; 705/1, 2, 28; 709/201, 202, 213, 217, 220; 711/147

(56) References Cited

U.S. PATENT DOCUMENTS

| | | | |
|---|---|---|---|
| 5,181,162 | * | 1/1993 | Smith et al. ........................ 364/419 |
| 5,594,899 | * | 1/1997 | Knudsen et al. .................... 707/103 |
| 5,734,887 | * | 3/1998 | Kingberg et al. ....................... 707/4 |
| 5,758,347 | * | 5/1998 | Lo et al. ............................. 707/103 |
| 5,873,097 | * | 2/1999 | Harris et al. ........................ 707/203 |
| 5,970,490 | * | 10/1999 | Morgenstern .......................... 707/10 |
| 5,978,808 | * | 11/1999 | Wells et al. .......................... 707/100 |
| 6,014,674 | * | 1/2000 | McCargar ............................. 707/202 |
| 6,016,394 | * | 1/2000 | Walker ................................ 395/701 |
| 6,122,640 | * | 9/2000 | Pereira ................................ 707/103 |
| 6,154,750 | * | 11/2000 | Roberge et al. ..................... 707/104 |
| 6,160,549 | * | 12/2000 | Touma et al. ........................ 345/333 |

OTHER PUBLICATIONS

Hanson, Eric et al., "Scalable Trigger Processing", Proceedings of the 15th International Conference on Data Engineering, Mar. 23–26, 1999, pp. 266–275.*

Kim, K. H. (Kane) et al., "Dynamic Configuration Management in Reliable Distributed Real–Time Information Systems", IEEE Transactions on Knowledge and Data Engineering, Jan.–Feb. 1999, vol. 11, Issue 1, pp. 239–254.*

* cited by examiner

*Primary Examiner*—Kim Vu
*Assistant Examiner*—Shahid Alam
(74) *Attorney, Agent, or Firm*—Baker & McKenzie

(57) ABSTRACT

A method and system for providing dynamic run-time object definition in a relational database. A mediating layer is introduced between applications and database objects. This layer mediates access to the physical database objects, such as tables, and allows applications to embed logical instead of physical names. If desired, the mediating layer can be maintained dynamically, as applications are running. The mediating layer preferably can run on a variety of relational databases, overcoming the vendor-specific extensions to SQL that relational database vendors have introduced.

9 Claims, 2 Drawing Sheets

METHOD AND APPARATUS FOR SUPPORTING DYNAMIC RUN-TIME OBJECT DEFINITION IN A RELATIONAL DATABASE MANAGEMENT SYSTEM

FIELD OF THE INVENTION

The present invention relates to database systems and methods.

BACKGROUND INFORMATION

Applications that access a relational database reference objects in the database (tables, columns, etc.) by name. This creates a close coupling between applications and the database objects. This close coupling causes complications when upgrading either the database or the application. This situation is exacerbated when multiple applications may reference the same objects and those applications may themselves be upgraded at different times at an installed site.

A traditional solution to the aforementioned problem is to make use of the "view" construct typically provided by relational databases. The use of database view, however, is problematic due to the well-known deficiencies of updating views and because views often incorporate non-standard SQL syntax in their definitions. Being able to run on relational databases from different vendors is a desirable capability.

SUMMARY OF THE INVENTION

The present invention is directed to a method and apparatus that allows dynamic run-time object definition in a relational database.

In an exemplary embodiment of the present invention, a layer of data and processing is introduced between the application and the database object. This layer mediates access to the physical layer and allows the application to embed logical instead of physical names. The present invention also allows for the maintenance of this layer to happen dynamically, as applications are running, if desired. The mediating layer preferably can run on a variety of relational databases, overcoming the vendor-specific extensions to SQL that relational database vendors have introduced.

An exemplary embodiment of the present invention is implemented with the POEMS Data Exchange (a.k.a. "DEX") and the POEMS service processor "ptsprdbm" of Platinum Technology, Inc. The DEX stores the data used by the mediating layer and the processing is handled by the ptsprdbm service processor. In this embodiment, the DEX mediating layer can be seen as a mapping between messages submitted to the DEX and the physical table layout of the DEX. This mapping allows for multiple associations to physical tables, thereby insulating higher layers from changes to the physical implementation. Also, the mediation defines logical transactions which associate one or more application requests with an action to be performed on a table or set of tables.

In an exemplary embodiment, each application creates one or more requests which are sent to the DEX. For each request, the DEX returns one result. There may be one or more ptsprdbm processes running. Each application request is handled by one ptsprdbm service processor process. The mediating layer data is stored in a metadata subject area of the DEX. All instances of ptsprdbm running on the same machine refer to the same metadata. The metadata maps requests from the applications to the physical tables. Consequently the applications do not need to know the identifiers of the physical tables. The physical tables may change over time and, provided that the metadata mapping is maintained, the applications will be insulated from these changes.

For example, a client may request data, through a message, about a logical entity called "machine". The logical name "machine" may or may not correspond to a physical table called "machine". It is the responsibility of the mediating layer to correctly translate logical transaction names to physical table names and columns.

In another example, a client may submit a message which is mapped to the logical transaction named "ip_address for machine" where "machine name"=absun10. In this example, the quoted elements should be considered logical objects which must be translated to physical objects. This is desirable since the requested data could change format as well. For example, in version 1 of POEMS, the physical database may store only one ip_address for each machine. In version 2 of POEMS, however, the database may store a list of ip_address for each machine. This would cause a different result set to be returned to the client, possibly breaking the client application. Using the mediating data, a new logical transaction is defined for version 2 which the service processor would know how to handle and the correct result set would be returned to the client.

An advantage of using a mediating data layer in accordance with the present invention is that applications can define new messages containing new logical transactions and have the DEX service processor correctly handle these new messages without modifications to the existing service processor. An application would simply add a row to the DEX metadata tables to define a new logical transaction. The service processor would know to map the new message to the logical transaction data added to the metadata tables and would consequently construct the correct SQL command for the new message.

Changes to the physical database can be handled in a similar way. A new logical transaction would be defined mapping an old message to a new table layout. This could be done either by using a version number with each transaction or by deleting the original transaction from the metadata.

The metadata could also be used to integrate tables created by the user into the DEX. The user would create a table using standard SQL, then would add rows to the DEX metadata tables to describe the new table. The user could also create per_triggers so that the new table could be automatically updated when an existing table is updated.

DETAILED DESCRIPTION

Figure 1:
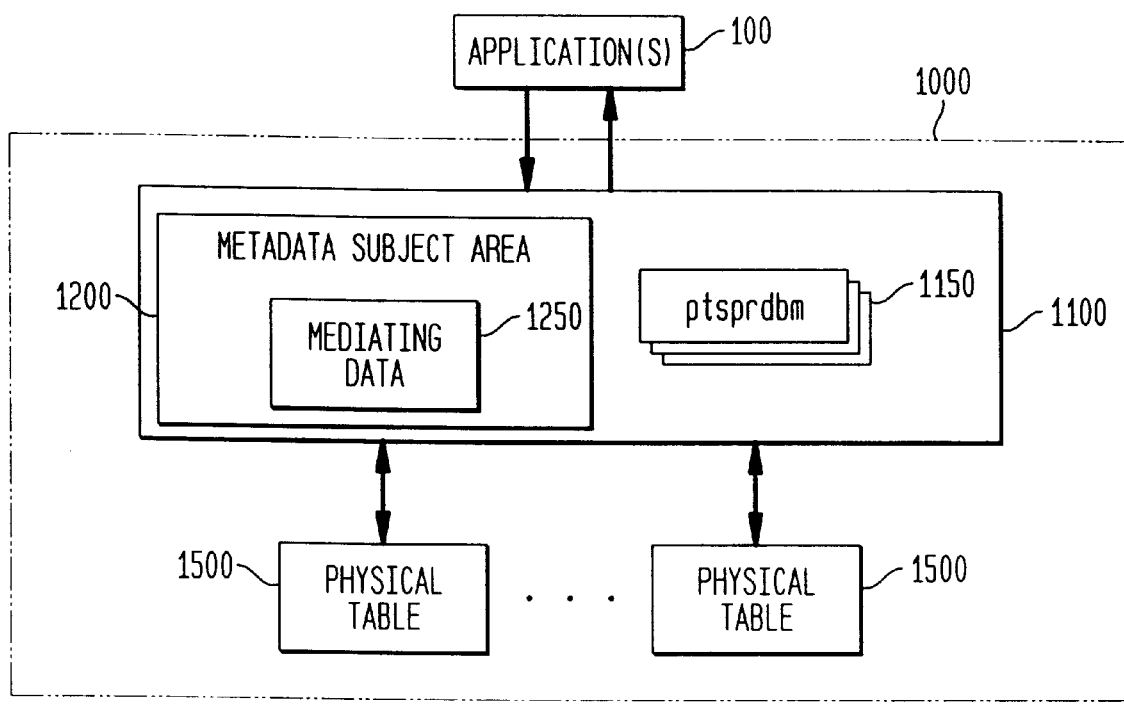
FIG. 1 is a block diagram of an exemplary system in accordance with the present invention.

FIG. 1 is a block diagram of an exemplary embodiment of a system in accordance with the present invention which is implemented with a POEMS data exchange (DEX) 1000. The POEMS DEX is described in the PLATINUM ProVision Common Services Reference Guide. The DEX 1000 comprises a plurality of physical tables 1500 and can interact with one or more applications 100. Examples of applications 100 include ProVision Director and TS Reorg.

In accordance with the present invention, a mediating layer 1100 is provided between the applications 100 and the physical tables 1500 of the DEX 1000. The mediating layer 1100 includes one or more instances of a POEMS relational database service processor (ptsprdbm) process 1150 and a metadata subject area 1200. Mediating data 1250 is stored in the metadata subject area 1200. The mediating data 1250 is used by the ptsprdbm service processor 1150 as described below.

The mediating layer 1100 provides a mapping between messages submitted to the DEX 1000 and the physical table layout of the DEX. This mapping allows for multiple associations to physical tables thereby insulating higher layers from changes to the physical implementation. Multiple logical names can refer to the same physical object and the logical names may change over time. Also, the mediation defines logical transactions which associate one or more application requests (e.g., PEC messages) with an action to be performed on a table or set of tables. An action corresponds to one of the data manipulation language (DML) verbs: insert, update, select, delete.

Each application 100 creates one or more requests and sends the requests to the DEX 1000. The DEX 1000 returns a result for each request received. One or more ptsprdbm service processor processes 1150 may be running at any one time. Each application request is handled by one ptsprdbm process 1150. All instances of ptsprdbm running on the same machine refer to the same metadata. There are one or more physical tables. The metadata maps requests from the applications to requests to the physical tables. Consequently the applications 100 do not need to know the identifiers of the physical tables 1500. The physical tables 1500 may change over time and, provided that the metadata mapping is maintained, the applications will be insulated from these changes.

The mediating metadata 1250 can be updated, for example, by updating POEMS or by updating an application 100. For example, a new application 100 can have new mediating data relevant to that application placed into the metadata subject area 1200. This capability provides flexibility in that the various products which use the system of the present invention can evolve separately, without requiring all applications to be updated at the same time. Preferably, such updates are carried out by the service processor 1150, as opposed to providing applications 100 direct access to the mediating metadata 1250.

Translations occur in the DEX service processor 1150. The service processor 1150 uses the mediating data 1250 to perform the translation. The service processor 1150 preferably uses a standard, open interface such as open database connectivity (ODBC) to interface with the metadata subject area 1200 and/or the applications 100.

In an alternative embodiment, a custom POEMS ODBC driver encapsulates the translation layer of the service processor 1150. This driver could then be used by third party applications for accessing the DEX (e.g. InfoReports).

In an exemplary embodiment, the mediating data 1250 comprises a set of tables as follows:

per_table: This table includes the master list of tables. Each table in the DEX will have an entry in this table.

per_column: This table contains an entry for each column of each table in the DEX. Attributes associated with each column are type, size and position of the column within a table.

per_data_type: This table includes a master list of all supported data types.

per_key: This table contains attributes for building primary and foreign keys on DEX tables.

per_logical_object: This table identifies a logical transaction and is used to lookup the transaction details as well as any triggers associated with the transaction.

per_tran_column: This table identifies the columns belonging to a logical transaction and whether or not the column participates in the construction of the SQL "where" clause.

per_trigger: This table associates a trigger with one or more logical transactions.

An exemplary schema for storing the mediating data 1250 as metadata is as follows:

```
CREATE TABLE per_source (
        per_source_id         int NOT NULL,
        source_description    varchar (255) NULL,
        product_id            int NULL,
        per_source            int NULL,
        per_last_updated      smalldatetime NOT NULL,
        per_status            smallint NULL,
        CONSTRAINT XPKper_source
               PRIMARY KEY (per_source_id)
)
CREATE TABLE per_tran_col_type (
        column_type           smallint NOT NULL,
        column_type_desc      varchar (31) NOT NULL,
        per_source            int NULL,
        per_last_updated      smalldatetime NOT NULL,
        per_status            smallint NULL,
        CONSTRAINT XPKper_tran_col_type
               PRIMARY KEY (column_type)
)
CREATE TABLE per_logical_object (
        object_id             int NOT NULL,
        object_name           varchar (30) NOT NULL,
        per_source            int NULL,
        per_last_updated      smalldatetime NOT NULL,
        per_status            smallint NULL,
        CONSTRAINT XPKper_logical_object
               PRIMARY KEY (object_id)
)
CREATE TABLE per_table (
        table_name            varchar (30) NOT NULL,
        storage_type          char (10) NULL,
        subject_area          CHAR (18) NULL,
        delete_policy         CHAR (18) NULL,
        sequence_nbr          numeric (10,0) NOT NULL,
        per_source            int NULL,
        per_last_updated      smalldatetime NOT NULL,
        per_status            smallint NULL,
        CONSTRAINT XPKper_table
               PRIMARY KEY (table_name)
)
CREATE TABLE per_key (
        table_name            varchar (30) NOT NULL,
        key_id                smallint NOT NULL,
        key_type              char (1) NOT NULL,
        foreign_table         varchar (30) NOT NULL,
        per_source            int NULL,
        per_last_updated      smalldatetime NOT NULL,
        per_status            smallint NULL,
        CONSTRAINT XPKper_key
               PRIMARY KEY (table_name, key_id)
)
CREATE TABLE per_data_type (
        data_type             smallint NOT NULL,
        data_type_desc        varchar (31) NOT NULL,
        per_source            int NULL,
        per_last_updated      smalldatetime NOT NULL,
        per_status            smallint NULL,
        CONSTRAINT XPKper_data_type
               PRIMARY KEY (data_type)
)
CREATE TABLE per_column (
        column_name           varchar (30) NOT NULL,
        table_name            char (18) NULL,
        table_sequence        smallint NOT NULL,
```

-continued

```
        column_size          int NOT NULL,
        null_flag            smallint NOT NULL,
        sequence_flag        smallint NOT NULL,
        per_source           int NULL,
        per_last_updated     smalldatetime NOT NULL,
        per_status           smallint NULL,
        CONSTRAINT XPKper_column
            PRIMARY KEY (colunm_name, table_name)
)
CREATE TABLE per_key_column (
        column_name          varchar (30) NOT NULL,
        table_name           varchar (30) NOT NULL,
        table_name           varchar (30) NOT NULL,
        key_id               smallint NOT NULL,
        per_source           int NULL,
        per_last_updated     smalldatetime NOT NULL,
        per_status           smallint NULL,
        CONSTRAINT XPKper_key_column
            PRIMARY KEY (colunm_name, table_name,
                table_name, key_id)
)
CREATE TABLE per_tran_type (
        tran_type            smallint NOT NULL,
        tran_type_name       varchar (31) NOT NULL,
        per_source           int NULL,
        per_last_updated     smalldatetime NOT NULL,
        per_status           smallint NULL,
        CONSTRAINT XPKper_tran_type
            PRIMARY KEY (tran_type)
)
CREATE TABLE per_tran (
        object_id            int NOT NULL,
        tran_type            smallint NOT NULL,
        tran_version         char (10) NOT NULL,
        per_source           int NULL,
        per_last_updated     smalldatetime NOT NULL,
        per_status           smallint NULL,
        CONSTRAINT XPKper_logical_tra
            PRIMARY KEY (object_id, tran_type)
)
CREATE TABLE per_trigger (
        object_id            int NOT NULL,
        tran_type            smallint NOT NULL,
        trigger_sequence     smallint NOT NULL,
        trigger_obj_name     varchar (30) NOT NULL,
        trigger_tran_type    smallint NULL,
        per_source           int NULL,
        per_last_updated     smalldatetime NOT NULL,
        per_status           smallint NULL,
        CONSTRAINT XPKper_trigger_det
            PRIMARY KEY (object_id, tran_type,
                trigger_sequence)
)
CREATE TABLE per_logical_column (
        object_id            int NOT NULL,
        logical_col_id       smallint NOT NULL,
        logical_col_name     varchar (30) NOT NULL,
        column_name          varchar (30) NOT NULL,
        table_name           varchar (30) NOT NULL,
        per_source           int NULL,
        per_last_updated     smalldatetime NOT NULL,
        per_status           smallint NULL,
        CONSTRAINT XPKper_logical_col
            PRIMARY KEY (object_id, logical_col_id)
)
CREATE TABLE per_tran_column (
        object_id            int NOT NULL,
        logical_col_id       smallint NOT NULL,
        tran_type            samllint NOT NULL,
        column_type          smallint NOT NULL,
        join_column          varchar (30) NOT NULL,
        join_table           varchar (30) NOT NULL,
        where_flag           smallint NOT NULL,
        order_by_sequence    smallint NOT NULL,
        group_by_sequence    smallint NOT NULL,
        sub_tran             varchar (30) NULL,
        per_source           int NULL,
        per_last_updated     smalldatetime NOT NULL,
        per_status           smallint NULL,
```

-continued

```
        CONSTRAINT XPKper_trans_detai
            PRIMARY KEY (object_id, logical_col_id,
                tran_type)
)
CREATE TABLE per_index_type (
        index_type           smallint NOT NULL,
        index_type_desc      char (20) NOT NULL,
        per_source           int NULL,
        per_last_updated     smalldatetime NOT NULL,
        per_status           smallint NULL,
        CONSTRAINT XPKper_index_type
            PRIMARY KEY (index_type)
)
CREATE TABLE per_index_column (
        column_sequence      smallint NOT NULL,
        table_name           varchar (30) NOT NULL,
        index_sequence       smallint NOT NULL,
        table_name           varchar (30) NOT NULL,
        column_name          varchar (30) NOT NULL,
        per_source           int NULL,
        per_last_updated     smalldatetime NOT NULL,
        per_status           smallint NULL,
        CONSTRAINT XPKper_index_colum
            PRIMARY KEY (column_sequence, table_name,
                index_sequence)
)
CREATE TABLE per_config (
        per_version          char (10) NOT NULL,
        sp_version           char (10) NOT NULL,
        doc_version          char (10) NOT NULL,
        install_date         smalldatetime NOT NULL,
        per_source           int NULL,
        per_last_updated     smalldatetime NOT NULL,
        per_status           smallint NULL,
        CONSTRAINT XPKper_config
            PRIMARY KEY (per_version, sp_version,
                doc_version)
)
CREATE TABLE per_status (
        per_status_nbr       smallint NOT NULL,
        per_status_name      varchar (31) NOT NULL,
        per_source           int NULL,
        per_last_updated     smalldatetime NOT NULL,
        per_status           smallint NULL,
        CONSTRAINT XPKper_status
            PRIMARY KEY (per_status_nbr)
)
```

Figure 2:
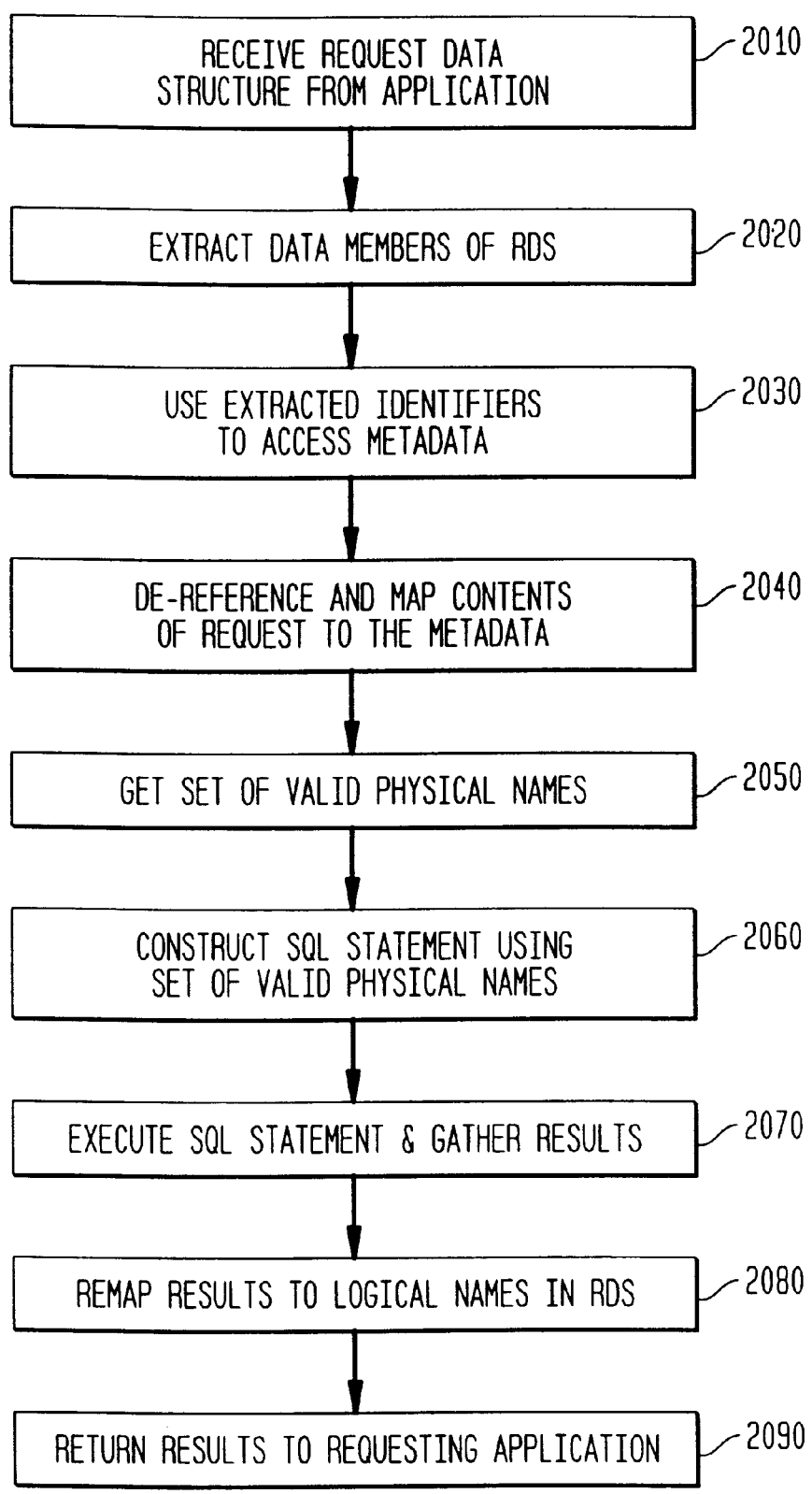
FIG. 2 is a flow-chart of an exemplary process in accordance with the present invention.

An exemplary method of operation of the service processor 1150 in accordance with the present invention is depicted in a flow-chart shown in FIG. 2.

As shown in FIG. 2, (an instance of) the service processor 1150 receives a request from an application 100 in step 2010. Such requests are encapsulated in a data structure—i.e., the request data structure or RDS—inside an application request. In step 2020, the service processor unpacks the application request and extracts the members of the RDS. The data members include identifiers which are used by the service processor in step 2030 to access the metadata stored in the DEX. In step 2040, the identifiers are processed against the metadata. More specifically, the service processor uses the metadata to de-reference and map the contents of the request to the metadata. This processing results in a translation of identifiers in the RDS into identifiers used in the physical tables 1500.

The result returned by the de-referencing procedure is a set of valid physical names for the current instance of the database. The service processor obtains the set of physical names in step 2050. The service processor then uses this data in step 2060 to construct an SQL statement which can be executed directly against the database. The service processor then executes the SQL statement in step 2070 and gathers the results from the processing of the SQL statement. The results of the execution of the SQL statement are remapped in step 2080 to the logical names in the RDS that was received in step 2010. The results are then returned in step 2090 to the application associated with the logical names that the application used when making the request. In this way, the application is entirely insulated from the physical database and the identifiers used therein.

In another embodiment of the present invention, additional metadata is stored about DEX data including information as to which entity is authoritative about the data (i.e., which application "owns" the data in the physical tables and which application can update or remove the data).

In a further exemplary embodiment, display and formatting information is stored for each logical object and used by an application for rendering the data accessed through the mediating layer on a monitor or in a report. Storing display and formatting information in the metadata allows applications that use such data to dynamically render the data returned to them.

What is claimed is:

1. A system for processing data in a database, the system comprising:
    mediating data storage, having one or more definitions of logical transactions which associate one or more application requests with actions to be performed and a trigger data structure associatd with each new table to automatically trigger updating of the new tables created when an existing table is updated;
    a processor, wherein the processor:
        receives a request from an application to process data;
        extracts a logical identifier from the received request;
        translates the logical identifier into a physical identifier by obtaining the physical identifier from the mediating data storage using the logical identifier;
        retrieves data stored in a physical table identified by the physical identifier;
        processes the data retrieved according to a logical transaction to obtain a result; and
        returns the result to the application using the logical identifier.

2. The system for processing data in a database as claimed in claim 1, wherein the mediating data storage is enabled to process a plurality of relational databases having different SQL extensions.

3. The system for processing data in a database as claimed in claim 1, wherein the one or more application requests include creating new tables.

4. A method for processing actions in a database system, comprising the steps of:
    receiving a request from an application to process data;
    extracting a logical identifier from the received request;
    translating the logical identifier into a physical identifier;
    retrieving data stored in a physical table identifier by the physical identifier;
    processing the data retrieved to obtain a result;
    triggering updating of one or more new tables when an existing table is updated; and
    returning the result to the application using the logical identifier.

5. The method of claim 4, wherein the step of translating includes obtaining the physical identifier from a mediating data storage using the logical identifier.

6. The method of claim 5, wherein the mediating data is updated dynamically.

7. The method of claim 5, wherein the mediating data storage is contained in a metadata subject area of the database system.

8. The method for processing actions in a database system as claimed in claim 4, wherein the step of processing further includes determining a version number of the application and the step of returning further includes returning the result in a format associated with the version number.

9. The method for processing actions in a database system as claimed in claim 4, wherein the step of processing further includes processing the data retrieved according to a logical transaction embedded in the request to obtain a result.

\* \* \* \* \*